United States Patent
Algüera et al.

(10) Patent No.: US 12,427,814 B2
(45) Date of Patent: Sep. 30, 2025

(54) COUPLING SYSTEM FOR A TOWING VEHICLE

(71) Applicant: JOST-WERKE DEUTSCHLAND GMBH, Neu-Isenburg (DE)

(72) Inventors: José Manuel Algüera, Aschaffenburg (DE); Michael Fischer, Nagold (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 18/860,208

(22) PCT Filed: Apr. 28, 2023

(86) PCT No.: PCT/IB2023/054424
§ 371 (c)(1),
(2) Date: Oct. 25, 2024

(87) PCT Pub. No.: WO2023/209656
PCT Pub. Date: Nov. 2, 2023

(65) Prior Publication Data
US 2025/0170864 A1     May 29, 2025

(30) Foreign Application Priority Data
Apr. 28, 2022   (DE) .................. 10 2022 001 493.9

(51) Int. Cl.
*B60D 1/01* (2006.01)
*B60D 1/62* (2006.01)
*B62D 53/08* (2006.01)

(52) U.S. Cl.
CPC .............. *B60D 1/015* (2013.01); *B60D 1/62* (2013.01); *B62D 53/0885* (2013.01)

(58) Field of Classification Search
CPC ....... B60D 1/015; B60D 1/62; B62D 53/0885
See application file for complete search history.

(56) References Cited

U.S. PATENT DOCUMENTS 5,435,194 A * 7/1995 Schedrat ................ G01G 19/12
280/504
5,526,702 A * 6/1996 Schedrat ................ G01G 19/12
177/136

(Continued)

FOREIGN PATENT DOCUMENTS

DE   3907763 A1   9/1990
DE   4003316 A1   8/1991

(Continued)

*Primary Examiner* — Valentin Neacsu
*Assistant Examiner* — Marlon A Arce
(74) *Attorney, Agent, or Firm* — Hudak, Shunk & Farine Co. LPA

(57) ABSTRACT

A coupling system for a towing vehicle, including a measuring element, wherein the coupling system has a fifth-wheel coupling plate on which a conically widened insertion region that is located in the longitudinal axis (x) of said plate and is intended for the introduction of a trailer-side coupling means and an adjoining locking region are formed, and at least two bearing blocks that engage laterally on the fifth-wheel coupling plate are provided, wherein the measuring element is situated in a mounting region of the coupling system such that operating forces ($F_x$, $F_y$) acting in the longitudinal axis (x) and/or a transverse axis (y) are determined thereby. A coupling system of which the measuring element is subjected to significantly lower wear effect. A bearing shell and a measuring shell are situated between at least one of the bearing blocks and the fifth wheel coupling plate, the mounting region being formed from the measuring shell.

18 Claims, 2 Drawing Sheets

(56) References Cited

U.S. PATENT DOCUMENTS

| | | | |
|---|---|---|---|
| 2019/0337342 A1* | 11/2019 | Genheimer | B60D 1/36 |
| 2022/0289317 A1* | 9/2022 | Dieter | B62D 53/0807 |
| 2022/0332154 A1* | 10/2022 | Köster | B60D 1/64 |
| 2023/0331319 A1* | 10/2023 | Bönisch | B62D 53/0842 |
| 2024/0067280 A1* | 2/2024 | Müller | B60D 1/36 |

FOREIGN PATENT DOCUMENTS

| | | |
|---|---|---|
| DE | 4308774 A1 | 6/1994 |
| DE | 4402525 A1 | 8/1994 |
| DE | 4402526 A1 | 8/1994 |
| DE | 60036184 T2 | 5/2008 |
| DE | 102006057327 A1 | 6/2008 |
| DE | 102019124273 A1 | 3/2021 |
| DE | 102019124281 A1 | 3/2021 |
| EP | 0823343 A1 | 2/1998 |
| EP | 3792165 A1 | 3/2021 |

\* cited by examiner

COUPLING SYSTEM FOR A TOWING VEHICLE

FIELD OF THE INVENTION

The invention relates to a coupling system for a towing vehicle with a measuring element, wherein the coupling system comprises a coupling main body in the form of a fifth-wheel coupling plate, on which a conically widened insertion region that is located in the longitudinal axis (x) of said plate is formed for the introduction of a trailer-side coupling means and a locking region adjoining it for holding the coupling means in the coupling main body, and at least one coupling bearing element is provided with two bearing blocks that engage laterally on the fifth-wheel coupling plate and by means of which the fifth-wheel coupling plate is mounted on the towing vehicle so as to be pivotable about a tilting axis ($y_{SK}$) extending transversely to the longitudinal axis (x), the measuring element is situated in a mounting region of the coupling system such that operating forces ($F_x$, $F_y$) acting in the longitudinal axis (x) and/or in a transverse axis (y) are determined.

BACKGROUND OF THE INVENTION

Such coupling systems serve to detachably connect a trailer vehicle to a towing vehicle. The towing vehicle is a tractor unit and the trailer vehicle is a semi-trailer, which form a tractor-trailer-combination when coupled together. A fifth-wheel coupling plate is attached to the tractor unit, into which a coupling means in the form of a kingpin protruding from the underside of the semi-trailer is inserted into the fifth wheel coupling in order to couple the semi-trailer.

In the past, there have already been efforts to equip the coupling system with a measuring element in order to be able to carry out a force measurement, for example. WO 2006/029731 A1 describes a displacement device for a fifth wheel coupling, which can contain not only position sensors but also a load sensor with which the load in the normal force direction can be determined. A bearing shell is arranged between the bearing blocks and the mounting region of the fifth wheel coupling plate and the load sensor is housed either inside the bearing shell or between the bearing block and the bearing shell. The measuring element is located exactly above a tilting axis of the fifth wheel coupling plate that runs through both bearing blocks. Together with the position sensors, the respective axle load for each individual axle of a given axle configuration of the towing vehicle can then be determined. With the help of the known measuring element, it is only possible to measure the load impressed by the semi-trailer in the direction of the normal force.

DE 600 36 184 T2 proposes a force-measuring fifth wheel coupling arrangement in which a force measuring unit is inserted into a mounting box of the fifth wheel coupling plate intended to accommodate the bearing block. The force measuring unit comprises a body with a semi-cylindrical surface on its underside, which is supported on a fastening bracket that is shaped to match it. Sensors for measuring force are inserted into recesses in the body on the sides. The main disadvantage of this known arrangement is that the body is subject to high levels of wear and tear and measurement errors due to wear can occur even after a short period of operation. In addition, when the body is replaced, the sensors and their wiring must also be replaced, which is a considerable expenditure of time and money.

SUMMARY OF THE INVENTION

The invention was therefore based on the object to develop a coupling system of which the measuring element is subject to a significantly lower wear effect and does not need to be replaced even after a longer period of operation.

The underlying object of the invention is solved with the features of a bearing shell and a measuring shell situated between at least one of the bearing blocks and the fifth-wheel coupling plate, the mounting region being formed from the measuring shell, and a receiving pocket is formed on an underside of the fifth-wheel coupling plate, into which the bearing shell and the measuring shell are inserted, and wherein the bearing shell and the measuring shell are dimensioned such that they are received by the receiving pocket and are held in a form-fitting manner in three spatial directions.

The mounting region of the coupling system is understood to be the area of a separate measuring shell that lies directly in the force flow of the operating forces and into which the measuring element is inserted. The measuring element used for this can in particular be a strain gauge (SG), a resistive sensor, a capacitive sensor, a piezo element, a force measuring bolt, a pressure-sensitive film or a measuring dowel. A measuring dowel is a sensor that is sensitive to force in the transverse direction, which is typically designed with a cylindrical shape and is always or at least when the expected operating load is present, fitted precisely or under preload in a complementary recess in the mounting region to be measured. The preload of the measuring dowel is achieved, for example, by means of a clamping device integrated into the measuring dowel.

The mounting region is formed by the measuring shell, which is inserted between a bearing shell arranged between the bearing block and the fifth wheel coupling plate and the fifth wheel coupling plate. Bearing shell serve as a wearing part and dampen the transmission of vibrations from the bearing blocks to the fifth wheel coupling plate. In most fifth wheel coupling plates, the bearing shells are inserted into receiving pockets formed on them. Due to the functional and structural separation of the bearing shell and measuring shell, a conventional bearing shell can still be used and replaced once the wear limit has been exceeded. The measuring shell, which is additionally inserted between the bearing block and the fifth wheel coupling plate, supports the measuring element(s) and is not or only to a small extent involved in wear, so that it can always remain in its intended position and does not need to be replaced. Typically, the measuring shell and bearing shell are placed flat against one another and support one another. The measuring shell and the bearing shell both cover or overlap the bearing block.

Of particular interest are the driving dynamics operating forces (in the x, y and z directions) and the resulting spatial force vectors at the interface between the towing vehicle and the trailer vehicle, from which the tractive force and any torsional moments around the vehicle's longitudinal axis as well as transverse forces transverse to the direction of travel can be determined during the journey. These operating forces can be used in particular to determine whether the trailer vehicle is currently operating in towing mode or, for example, in pushing mode when driving downhill. Likewise, by recording the operating forces, it can be determined, for example, whether the driving situation is unstable when cornering too quickly. At the interface between the towing vehicle and the trailer vehicle, the operating forces occurring during driving can also be distinguished from test loads from special driving conditions, such as an accident situation involving a tipped-over trailer vehicle.

The bearing blocks serve to support the fifth wheel coupling plate against the towing vehicle and allow the fifth wheel coupling plate to tilt around its tilting axis, which runs in the direction of the transverse axis. The tilting axis typically intersects the locking area of the fifth wheel coupling plate. All forces transmitted to the fifth wheel coupling plate are distributed between the two bearing blocks, so that a measurement in this area delivers particularly error-free measurement results. In addition, the bearing blocks and the fifth wheel coupling plate are standardized components, so that when converting to the coupling system according to the invention, both the bearing blocks and the fifth wheel coupling plate could continue to be used and only the measuring shell would have to be used as an additional component.

It is preferred that the bearing shell and/or measuring shell has a U-shape that is open on one side and which accommodates the bearing block. The open side of the U-shape overlaps the bearing block, in particular its head region. The outside(s) of the U-shaped measuring shell rests on the fifth wheel coupling plate and is therefore involved in the transmission of the operating forces in the longitudinal axis and/or the transverse axis.

Advantageously, the free ends of the U-shaped bearing shell and/or measuring shell overlap a head region of the bearing block on both sides in the longitudinal axis and/or the transverse axis. This results in the advantage that the bearing shell and the measuring shell are supported against each other in a form-fitting manner. In addition, measuring elements can also be accommodated in the free ends of a U-shaped measuring shell, which in particular record forces occurring in the longitudinal axis, provided that the measuring element(s) is/are arranged in the free end that overlaps the bearing block in the longitudinal axis, or forces occurring in the transverse axis, provided that the measuring element(s) is/are arranged in the free end that overlaps the bearing block in the transverse axis.

Preferably, a receiving pocket is formed on the underside of the fifth wheel coupling plate, into which the bearing shell and/or measuring shell is/are inserted. The receiving pocket is formed in particular as a downwardly open recess on the fifth wheel coupling plate, into which the bearing block at least partially protrudes. The bearing shell and/or measuring shell are dimensioned such that they are received in the receiving pocket and are held in a form-fitting manner in three spatial directions.

According to a particularly favorable embodiment, the bearing shell is contacted by the bearing block and the measuring shell by the fifth wheel coupling plate. In this respect, there is no contact between the measuring shell and the associated bearing block. A relative movement that causes wear takes place exclusively between the bearing block and the associated bearing shell resting on it. The measuring shell and the bearing shell lie against one another on one side with their facing sides.

The bearing shell and the measuring shell are expediently supported directly on one another. In particular, in a section arranged above the bearing block, the bearing shell and the measuring shell are arranged one above the other in the direction of the normal force and thus both participate in the transmission of the operating forces.

Advantageously, a deformation of the mounting region is detected by the at least one measuring element. A deformation of the mounting region is understood to mean, in particular, an elongation or compression.

An embodiment in which a receiving opening is formed in the mounting region into which the measuring element is inserted is particularly preferred. The receiving opening is a bore or generally an opening in the material of the mounting region.

The measuring element inserted into the receiving opening can be mechanically clamped, glued or cast into the receiving opening and thus connected in a force-locking manner to the mounting region to be measured. The receiving opening protects the measuring element and also enables positioning in an otherwise inaccessible but mechanically highly stressed area that is subject to particularly large deformation and thus enables the recording of precise measured values.

The measuring element is expediently inserted completely into the receiving opening and is thereby evacuated from external influences.

It has proven to be useful if the measuring element is flush with a first wall section of a first bearing area surrounding the receiving opening, and a force shunt is effected via the measuring element by contact with a second wall section of a second bearing area. This embodiment is particularly suitable for a measurement between structurally separate, adjacent storage areas with their wall sections lying on top of one another. The measuring element is sunk into its associated receiving opening to such an extent that, in addition to the measuring element, part of the force flow transmitted by the second bearing area is transmitted directly from its second wall section to the first wall section of the first bearing area, and only another, usually smaller part of the force flow is transmitted from the second wall section of the second bearing area to the measuring element and from there to the first bearing area. This force shunt protects the measuring element from overloading beyond the specified measuring range of the measuring element, since any overloads are transmitted from the first to the second wall section and bypassed by the measuring element. In addition, this embodiment leads to even more precise measurement results, since the measuring element needs to have a less spread measuring range and only needs to be adjusted to a relatively small measuring range.

The measuring element can be arranged in such a way that it records resulting forces $F_{res}$ whose direction of action is at an angle $\alpha$ of up to 45° relative to a direction of action of the operating forces to be determined. The measuring element thus records the particularly large change in the operating force to be expected in the respective force direction.

Preferably, the at least one measuring element is installed under mechanical prestress. Due to the prestress, it is possible to use the measuring element to record both an increase in an operating force and a decrease in the operating force, since the measuring element has a correspondingly shifted offset of its zero point due to the prestress. In normal towing operation, the measuring element installed with a prestress would record an increase in the operating force. When driving downhill with a pushing trailer, however, the measuring element shows a lower measured value than, for example, with a stationary towing and trailer vehicle. Alternatively, two measuring elements can be installed, the effect of which unfolds in such a way that operating forces along a vector are recorded in one direction of action by a first measuring element and in the opposite direction of action by a second measuring element.

Advantageously, several measuring elements are provided, of which at least one measuring element is arranged in front of the longitudinal axis and at least one measuring element is arranged behind the tilting axis of the fifth-wheel coupling plate. This makes it particularly effective to record operating forces in the longitudinal axis. When the towing vehicle accelerates positively, the measuring element at the front in the longitudinal axis in the direction of travel is relieved and the measuring element at the rear in the longitudinal axis in the direction of travel is loaded. When the towing vehicle accelerates negatively, however, the measuring element at the front in the longitudinal axis shows a higher measured value and the measuring element at the rear in the longitudinal axis shows a lower measured value.

If several measuring elements are provided, at least one measuring element can be arranged on a first side of the longitudinal axis and at least one measuring element on an opposite, second side of the longitudinal axis. In this configuration, at least two measuring elements are mounted in the transverse direction on opposite sides of the longitudinal axis, which means that the operating forces in the direction of the transverse axis are recorded particularly precisely. When cornering, the fifth wheel plate twists because the semitrailer rocks towards the outside of the curve. The first side on the inside of the curve is raised and the second side on the outside of the curve is loaded downwards. These deformations of the fifth wheel plate in the vertical axis are recorded particularly well by the measuring elements arranged on different sides of the longitudinal axis and used to interpret cornering.

It is particularly useful if at least two measuring elements are arranged on a first side of the longitudinal axis and spaced apart from one another in the transverse axis, as a supplementary or alternative measure. In this embodiment, two measuring elements are also offset from one another in the transverse direction, but on one side of the longitudinal axis. This arrangement enables the attachment of measuring elements even in cramped installation conditions, in particular when a second side of the longitudinal axis is occupied by an operating lever, the locking mechanism or, for example, a lubrication system and there is insufficient space available to accommodate the measuring elements. In addition, this configuration allows for an even more accurate interpretation of the twisting of the fifth wheel plate when cornering.

Preferably, the at least one measuring element is connected to an electronic evaluation unit, by means of which the operating forces and resulting accelerations are calculated from a signal provided by the measuring element.

The measuring element(s) can be connected to the electronic evaluation unit by means of cables or wirelessly. The electronic evaluation unit can also be connected to the vehicle control unit and receive driving data from it and/or exchange it with it. It is also possible for the electronic evaluation unit to influence the vehicle control, in particular the engine and braking performance, based on the operating forces determined therein.

The measuring element can be powered independently using its own battery or by a supply voltage from the vehicle electrical system or the evaluation unit.

BRIEF DESCRIPTION OF THE DRAWINGS

For a better understanding, the invention is explained in more detail below using three figures. The figures show the FIG. 1: a side view of a coupling system with a fifth wheel coupling plate and a measuring element on a measuring shell.

DETAILED DESCRIPTION OF THE INVENTION

Figure 1:
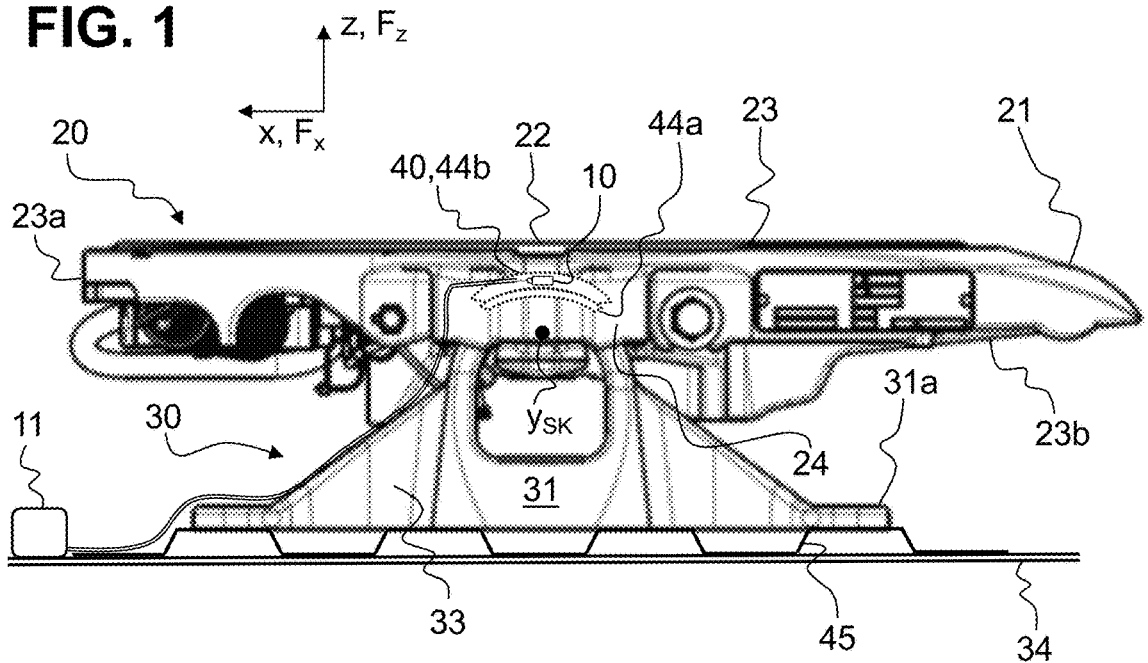

FIG. 1 shows a side view of a coupling system with a coupling main body 20 in the form of a fifth-wheel coupling plate 23, which is fastened to a mounting plate 45 by means of a coupling bearing element 30 in the form of two bearing blocks 31 arranged one behind the other in the image plane. For this purpose, each bearing block 31 is designed with a screw-on flange 31a at its front and rear ends in the longitudinal axis x. The mounting plate 45 is placed on a vehicle chassis 34 from above and is fixedly connected to it.

The mounting plate 45 is formed as a one-piece, integral trapezoidal sheet and has sections that rest on the vehicle chassis 34 in sections and sections that are spaced apart from the vehicle chassis 34. In the embodiment shown, each bearing block 31 is designed with a lower edge running straight between the screw-on flanges 31a, which only contacts the sections of the mounting plate 45 that are spaced apart from the vehicle chassis 34.

The fifth wheel coupling plate 23 is delimited at the edge by an outer contour 23a and has an insertion region 21 at the end, via which a trailer-side coupling means is inserted into the fifth-wheel coupling plate 23 in the direction of the longitudinal axis x and, after reaching its end position, is held in a centrally located locking region 22 so that it can pivot about a vertical axis z. The bearing blocks 31 engage on an underside 23b of the fifth-wheel coupling plate 23.

In the embodiment shown, a mounting region 40 is formed from a measuring element 10 arranged in a measuring shell 44b. The measuring element 10 is, for example, connected to an electronic evaluation unit 11, which determines the operating force $F_x$ measured in real time in the longitudinal axis x as well as the operating force $F_y$ in the transverse axis y and, if applicable, the operating force $F_z$ in the direction of the vertical axis z from the measured values of the measuring element 10.

In particular, it is also possible for the electronic evaluation unit 11 to communicate with a vehicle control unit (not shown here) and to provide it with the operating forces $F_x$, $F_y$, $F_z$.

Figure 2:
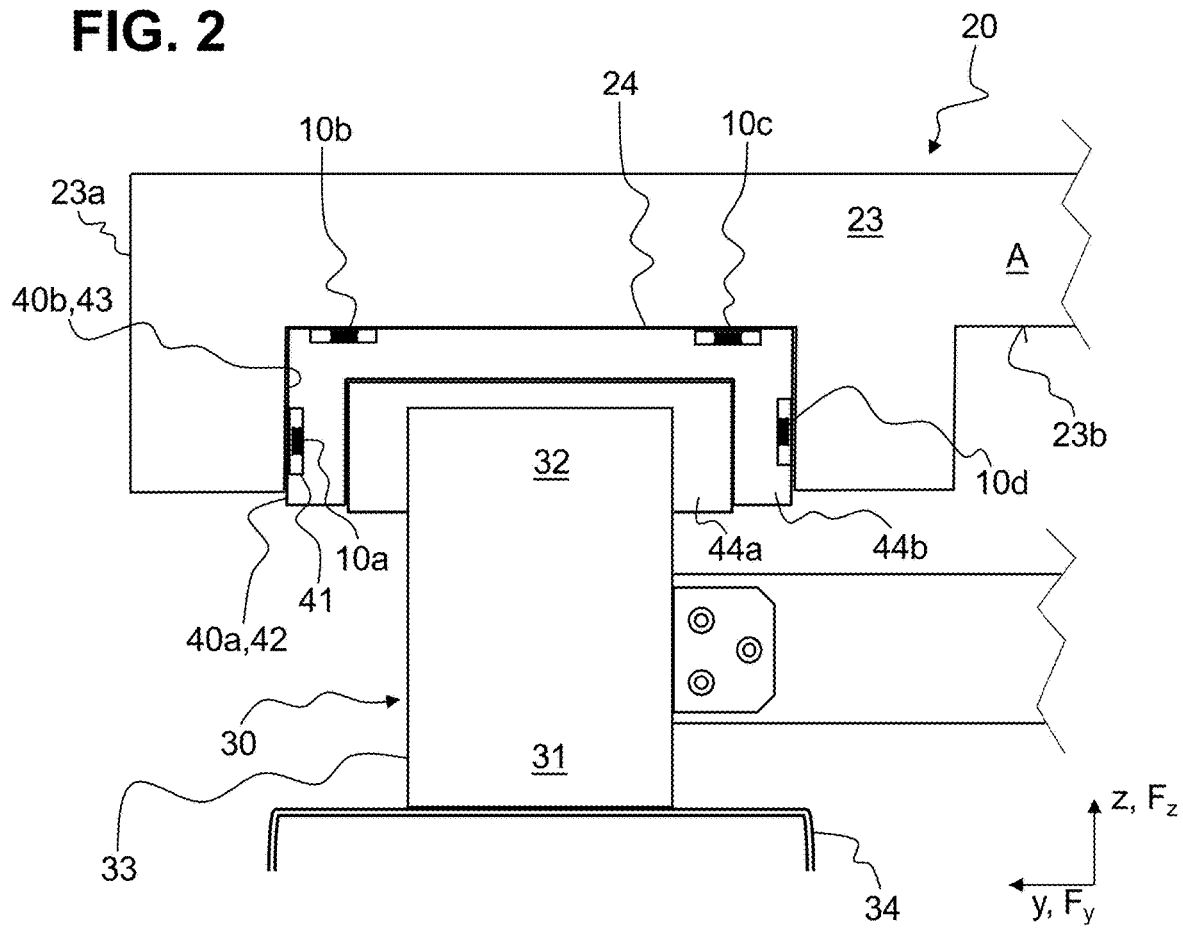
FIG. 2: a cross section through a receiving pocket of the fifth wheel coupling plate with several measuring elements arranged in the measuring shell

FIG. 2 shows a cross section through one side of the fifth-wheel coupling plate 23 along a tilting axis $y_{SK}$ in FIG. 1 with a bearing block 31 arranged underneath. A head region 32 of the bearing block 31 extends into a downwardly open receiving pocket 24 of the fifth-wheel coupling plate 23, which is formed on the underside 23b of the fifth-wheel coupling plate 23. Essentially vertically aligned walls 33 of the bearing block 31 extend between the head region 32 and the screw-on flanges 31a.

The measuring shell 44b and a bearing shell 44a are inserted into the receiving pocket 24, which in turn rests on the head region 32 of the bearing block 31. The measuring shell 44b and the bearing shell 44a are both designed in a U-shape and as a result also transmit operating forces $F_y$ in the direction of the transverse axis y.

In the measuring shell 44b, in a first wall section 42 facing the receiving pocket 24, receiving openings 41 are formed for, for example, four measuring elements 10a, 10b, 10c, 10d, which form a first bearing area 40a. The measuring elements 10a, 10b, 10c, 10d end on the outside with the first wall section 42 and, together with the first wall section 42, rest against the receiving pocket 24 of the fifth-wheel plate 23. The receiving pocket 24 has a second wall section 43 facing the measuring shell 44b, which forms a second bearing area 40b. Both the first wall section 42 of the measuring shell 44b and the measuring elements 10a, 10b, 10c, 10d rest against the second wall section 43 of the receiving pocket 24, so that when a force is transmitted from the fifth-wheel coupling plate 23 to the measuring shell 44b, a force shunt occurs running via the measuring element 10a, 10b, 10c, 10d.

Figure 3:
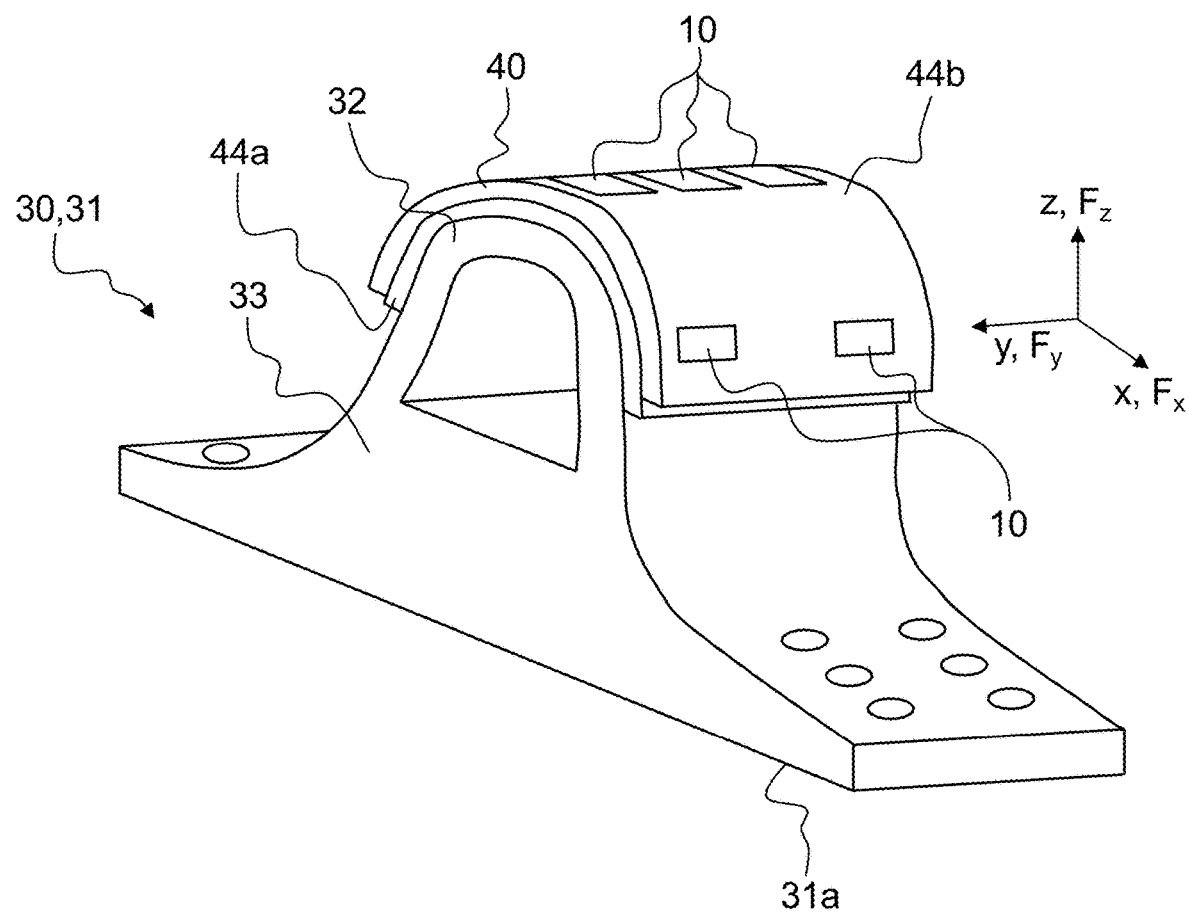
FIG. 3: a perspective view of a bearing block with a bearing shell and a measuring shell with several measuring elements integrated therein.

FIG. 3 shows a perspective view of a bearing block 31 with a bearing shell 44a placed in its head region 32 and a measuring shell 44b covering the latter on the outside, which forms the mounting region 40. Several force measuring elements 10 are inserted into the measuring shell 44b.

The measuring elements 10 integrated into the measuring shell 44b are arranged on the side of the measuring shell 44b facing away from the bearing shell 44a, and are therefore not subject to any significant relative movement with respect to the receiving pocket 24 (see FIG. 2) and are therefore hardly subject to wear. In principle, the measuring elements 10 can also be fully integrated into the measuring shell 44b for even better protection.

In principle, the bearing shell 44a and the measuring shell 44b are always provided with a complementary shape and lie flat against one another. To disassemble the bearing shell 44a, particularly in the case of advanced wear, all that is needed is to lift the fifth-wheel plate 23 off the bearing blocks 31 and replace the bearing shell 44a. The measuring shell 44b, on the other hand, can remain in the receiving pocket 24 of the fifth-wheel plate 23 and simply be placed on the newly inserted bearing shell 44a.

In the measuring shell 44b, several measuring elements 10 are arranged offset from one another in the direction of the transverse axis y, whereby tilting moments occurring around the longitudinal axis x can already be measured on one of the two bearing blocks 31.

In addition, several measuring elements 10 are also arranged offset from one another in the longitudinal axis x in the measuring shell 44b, whereby the measuring elements 10 located in the image plane behind the bearing block 31 are concealed and therefore not visible.

Due to the offset arrangement of the measuring elements 10 in the longitudinal axis x, positive or negative accelerations in the longitudinal axis x as well as resulting tilting moments about the transverse axis y can be detected particularly well.

LIST OF REFERENCE NUMERALS 10 measuring element
10a first measuring element
10b second measuring element
10c third measuring element
10d fourth measuring element
11 electronic evaluation unit
20 coupling main body
21 insertion region
22 locking region
23 fifth-wheel coupling plate
23a outer contour of fifth-wheel coupling plate
23b underside of fifth-wheel coupling plate
24 receiving pocket
30 coupling bearing element
31 bearing block
31a screw-on flange of bearing block
32 head region of bearing block
33 walls of bearing block
34 vehicle chassis
40 mounting region
40a first bearing area
40b second bearing area
41 receiving opening of measuring element
42 first wall section
43 second wall section
44a bearing shell
44b measuring shell
45 mounting plate
$F_x$ force in longitudinal axis
$F_y$ force in transverse axis
$F_z$ force in vertical axis
x longitudinal axis
y transverse axis
$y_{SK}$ tilting axis of fifth-wheel plate
z vertical axis

What is claimed is:

1. A coupling system for a towing vehicle, comprising:
a measuring element, wherein the coupling system comprises a coupling main body in the form of a fifth-wheel coupling plate, on which a conically widened insertion region that is located in a longitudinal axis (x) of said plate is formed for the introduction of a trailer-side coupling means and a locking region adjoining it for holding the coupling means in the coupling main body, and at least one coupling bearing element is provided with two bearing blocks that engage laterally on the fifth-wheel coupling plate and by means of which the fifth-wheel coupling plate is mounted on the towing vehicle so as to be pivotable about a tilting axis ($y_{SK}$) extending transversely to the longitudinal axis (x), the measuring element is situated in a mounting region of the coupling system such that operating forces ($F_x$, $F_y$) acting in the longitudinal axis (x) and/or in a transverse axis (y) are determined,
wherein a bearing shell and a measuring shell are situated between at least one of the bearing blocks and the fifth-wheel coupling plate, the mounting region being formed from the measuring shell, and a receiving pocket is formed on an underside of the fifth-wheel coupling plate, into which the bearing shell and the measuring shell are inserted, and
wherein the bearing shell and the measuring shell are dimensioned such that they are received by the receiving pocket and are held in a form-fitting manner in three spatial directions.

2. The coupling system according to claim 1, wherein the bearing shell and/or measuring shell have a U-shape that is open on one side and which accommodates the bearing block.

3. The coupling system according to claim 2, wherein a head region of the bearing block is overlapped on both sides in the longitudinal axis (x) and/or the transverse axis (y) by free ends of the U-shaped bearing shell and/or measuring shell.

4. The coupling system according to claim 1, wherein the bearing shell is contacted by the bearing block and the measuring shell is contacted by the fifth wheel coupling plate.

5. The coupling system according to claim 1, wherein the bearing shell and the measuring shell are supported directly on one another.

6. The coupling system according to claim 1, wherein a deformation of the mounting region is detected by the at least one measuring element.

7. The coupling system according to claim 1, wherein a receiving opening is formed in the mounting region, into which the measuring element is inserted.

8. The coupling system according to claim 7, wherein the measuring element is completely inserted into the receiving opening.

9. The coupling system according to claim 7, wherein the measuring element is flush with a first wall section of a first bearing area surrounding the receiving opening, and a force shunt is effected via the measuring element by contact with a second wall section of a second bearing area.

10. The coupling system according to claim 1, wherein the at least one measuring element is installed under mechanical prestress.

11. The coupling system according to claim 1, wherein several measuring elements are provided, of which at least one measuring element is arranged in front of the longitudinal axis (x) and at least one measuring element is arranged behind the tilting axis ($y_{SK}$).

12. The coupling system according to claim 1, wherein at least two measuring elements are arranged on one side of the longitudinal axis (x) and are spaced from one another in a direction of the transverse axis (y).

13. The coupling system according to claim 3, wherein the bearing shell is contacted by the bearing block and the measuring shell is contacted by the fifth wheel coupling plate, and wherein the bearing shell and the measuring shell are supported directly on one another.

14. The coupling system according to claim 13, wherein a deformation of the mounting region is detected by the at least one measuring element, and wherein a receiving opening is formed in the mounting region, into which the measuring element is inserted.

15. The coupling system according to claim 14, wherein the measuring element is completely inserted into the receiving opening.

16. The coupling system according to claim 14, wherein the measuring element is flush with a first wall section of a first bearing area surrounding the receiving opening, and a force shunt is effected via the measuring element by contact with a second wall section of a second bearing area.

17. The coupling system according to claim 15, wherein the at least one measuring element is installed under mechanical prestress, and wherein several measuring elements are provided, of which at least one measuring element is arranged in front of the longitudinal axis (x) and at least one measuring element is arranged behind the tilting axis ($y_{SK}$).

18. The coupling system according to claim 16, wherein the at least one measuring element is installed under mechanical prestress, and wherein at least two measuring elements are arranged on one side of the longitudinal axis (x) and are spaced from one another in a direction of the transverse axis (y).

* * * * *